United States Patent [19]

Mizoguchi et al.

[11] Patent Number: 5,689,105

[45] Date of Patent: Nov. 18, 1997

[54] MAGNETIC CARD DATA PROCESSING DEVICE

[75] Inventors: Atushi Mizoguchi, Hikone; Ichiro Kubo; Mashairo Seguchi, both of Ohtsu; Sumiaki Adachi, Kustatsu, all of Japan

[73] Assignee: Omron Corporation, Japan

[21] Appl. No.: 700,089

[22] Filed: Aug. 20, 1996

Related U.S. Application Data

[63] Continuation of Ser. No. 188,334, Jan. 25, 1994, abandoned.

[30] Foreign Application Priority Data

Jan. 25, 1993 [JP] Japan ..................... 5-010039
Jul. 30, 1993 [JP] Japan ..................... 5-189688

[51] Int. Cl.$^6$ .......................................... G06K 7/08
[52] U.S. Cl. .................................. 235/475; 235/449
[58] Field of Search ........................... 235/475, 477, 235/480, 379, 449; 360/2

[56] References Cited

U.S. PATENT DOCUMENTS

| | | | |
|---|---|---|---|
| 4,146,174 | 3/1979 | Darjany et al. | |
| 4,237,624 | 12/1980 | Yeh | |
| 4,287,409 | 9/1981 | Auchinleck | 235/475 |
| 4,314,153 | 2/1982 | Humphries et al. | 250/231.16 |
| 4,476,457 | 10/1984 | Kondo | 250/231.16 |
| 4,553,035 | 11/1985 | Malinsky et al. | |
| 4,555,625 | 11/1985 | Mosier et al. | 250/231.16 |
| 4,939,351 | 7/1990 | Alanx et al. | 235/379 |
| 5,337,304 | 8/1994 | Hashi et al. | 235/475 |

FOREIGN PATENT DOCUMENTS

A-2 531 575  7/1975  Germany.

OTHER PUBLICATIONS

Patent abstracts of Japan, vol. 7, No. 164 (P-211), 1983; JP-A-58070410 (Touhoku Kinzoku Kogyo K.K.).
Patent abstracts of Japan, vol. 5, No. 196 (P-93), 1981; JP-A-56118175 (Nippon Denki K.K.).

*Primary Examiner*—Donald T. Hajec
*Assistant Examiner*—Mark Tremblay
*Attorney, Agent, or Firm*—Klima & Hopkins, P.C.

[57] ABSTRACT

A card processing device for processing data on a card comprising a processor configured to move along with the card and process data on the card as it is moving, a detection device which detects the displacement of the processor relative to the card in a manner which is directly dependent on the movement of either the card or the processor, and a converter device which converts the signal from the detection device to a reference signal for the processing of the data.

19 Claims, 18 Drawing Sheets

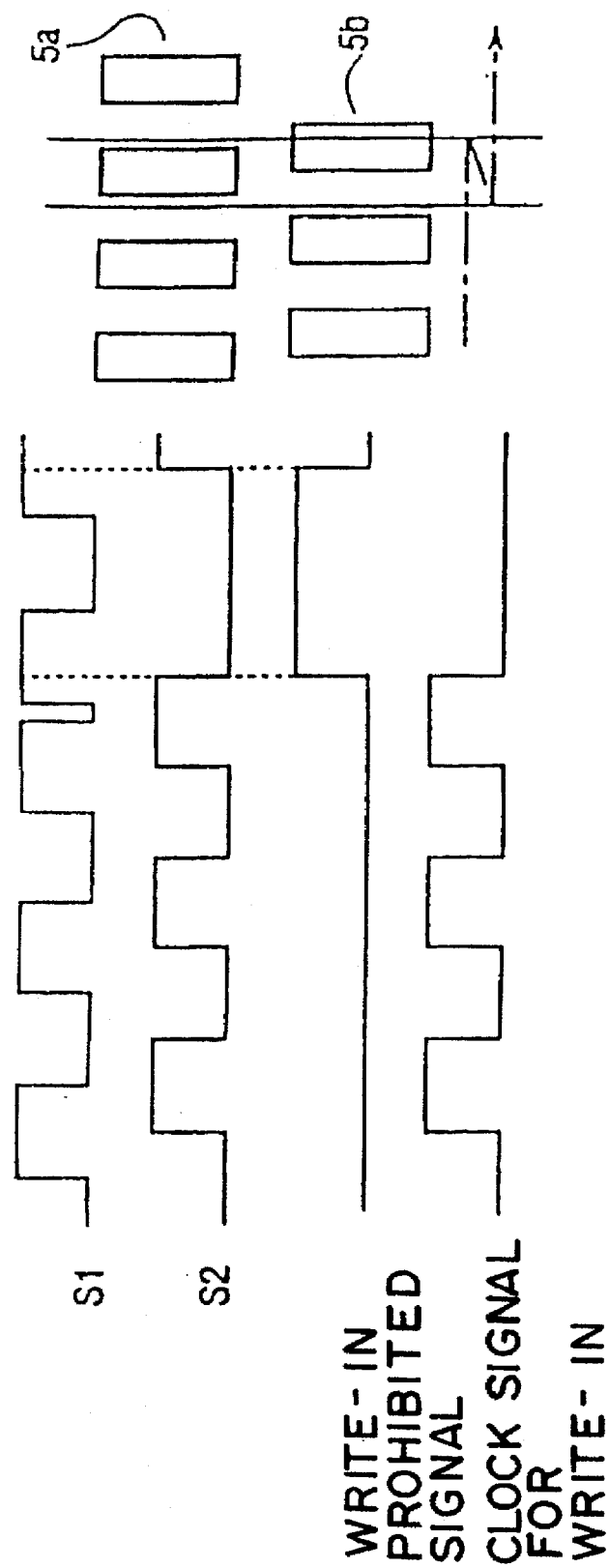

FIG. 15
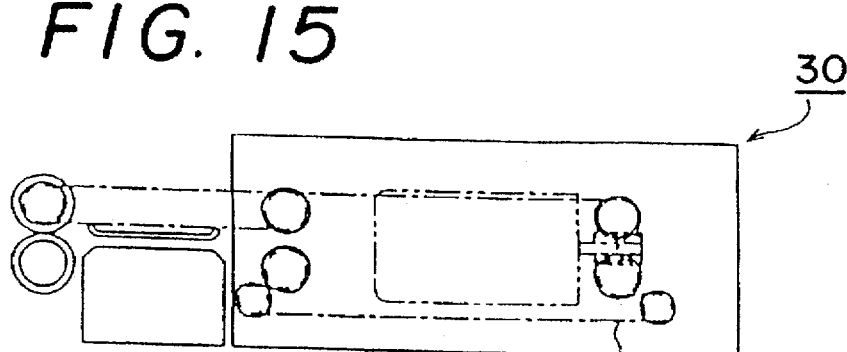
FIG. 16
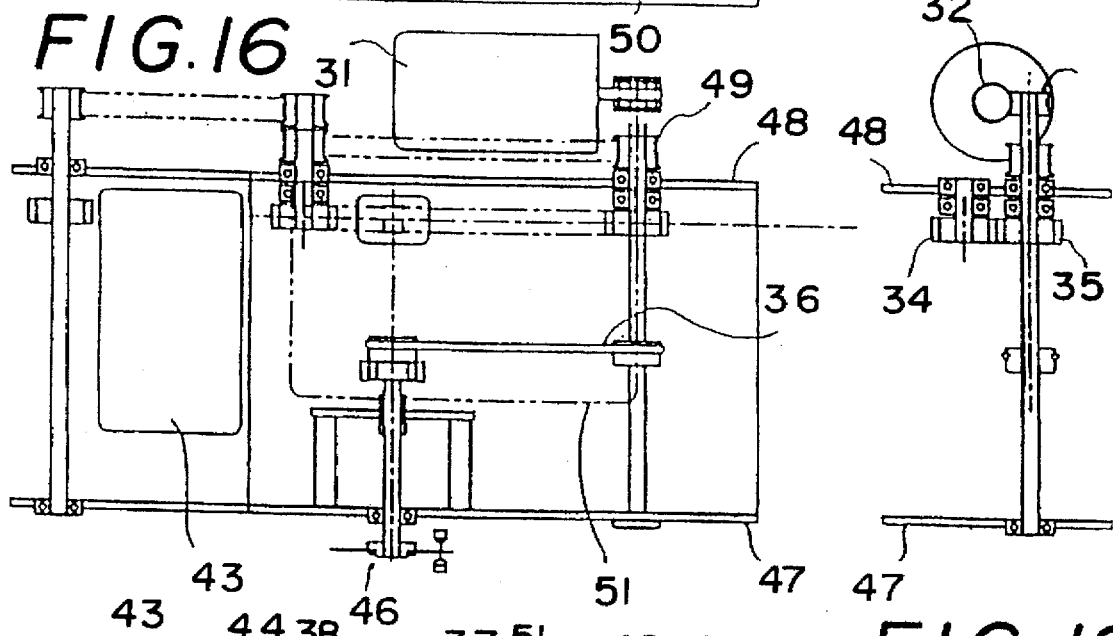
FIG. 18
FIG. 17
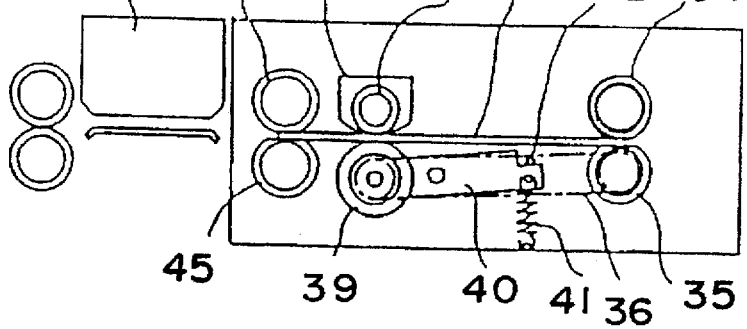

FIG. 22
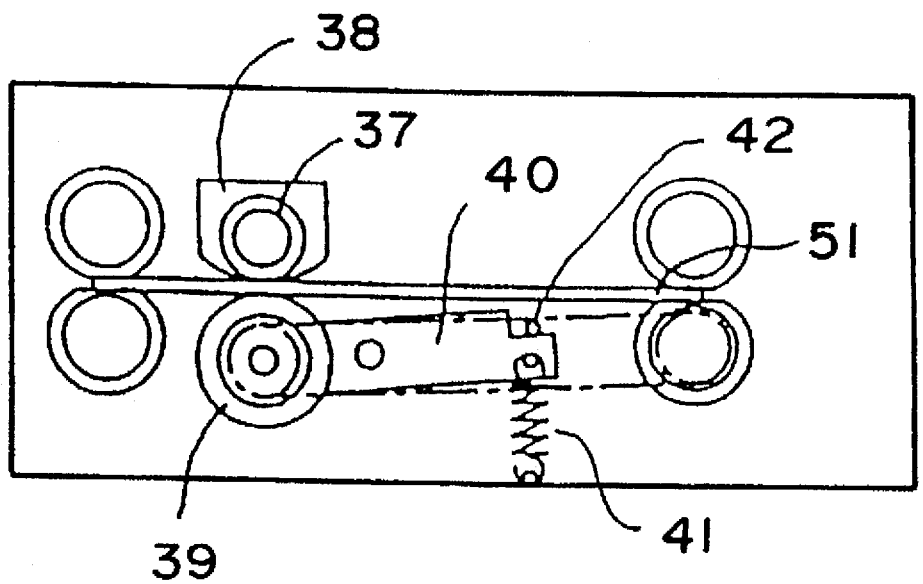
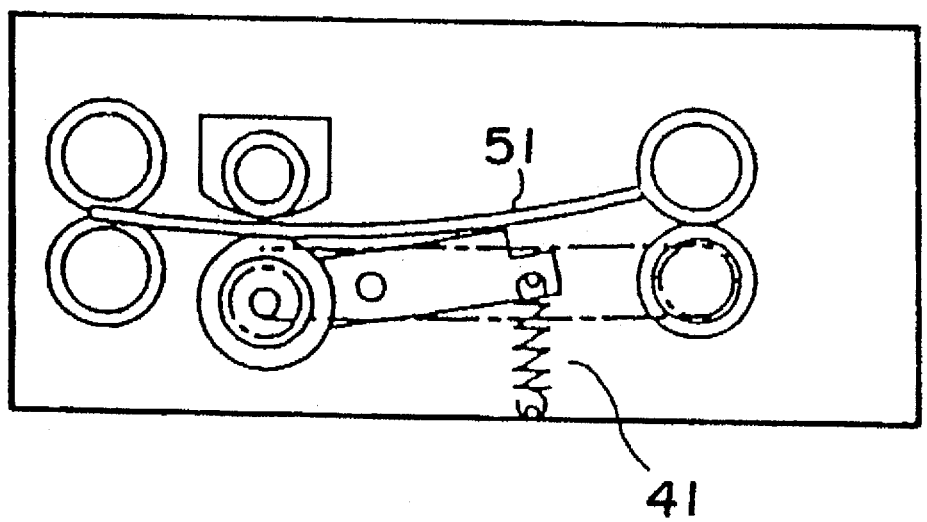
PRIOR ART
FIG. 23

MAGNETIC CARD DATA PROCESSING DEVICE

This application is a continuation of application Ser. No. 08/188,334, filed Jan. 25, 1994, now abandoned.

FIELD OF THE INVENTION

This invention is directed to a card processing device including a reader and writer for data on magnetic cards.

BACKGROUND OF THE INVENTION

To accurately process data on a card (i.e. to read and write magnetically encoded data on the card) while that card is being conveyed along a course, one must produce clock signals to serve as a reference for the timing of processing operations based on the displacement of the card as it is conveyed.

Existing card processing devices have an encoder provided either on the rotating shaft of the motor which generates the force to convey the card, or on a rotating member of the mechanism which transmits the motor's rotation to the card. The motor is controlled for constant velocity based on pulse signals outputted by this encoder. These signals are also used as clock signals for the reading and writing of data.

An existing card processing device is pictured in FIG. 32. This device has three sets of paired conveyor rollers 201 (a–c). The route the card follows is located between these pairs of rollers. Magnetic head 202, which is mounted on the shaft of the central pair of rollers 201a processes the data on the card. During data processing, conveyance force is applied to the card only by rollers 201a, as it is crucial to prevent changes in the speed of the card that might occur as forward rollers 201b stop supplying conveying force and rear rollers 201c begin supply conveying force.

Existing card processing devices do not detect the displacement of the card along the route of conveyance in a way which is directly dependent on the movement of the card. The dimensional accuracy of the gears, cogged belts and pulleys constituting the transmission mechanism have an effect on the detection signal produced by the encoder, as would the stretching or slipping of the belts over time. The linear relationship between the rotational velocity of the encoder and the velocity at which a card is conveyed can be affected, and the device would no longer be able to generate a clock signal in good enough conformity with the true displacement of the card to allow it to serve as a reference to perform processing.

Because the existing card processing devices have three sets of rollers, their construction tends to be complicated, and such devices cannot easily be made smaller, nor can their cost be reduced.

SUMMARY OF THE INVENTION

An object of the present invention is to provide an improved card processing device including a reader and write for magnetic cards.

Another object of the present invention is to provide a card processing device that is more accurate and simple in construction by providing means to detect a reference signal for processing data on a card in a way which is more directly dependent on the movement of the card being conveyed.

A further object of the present invention is to provide a card processing device which can process data on the card according to the true relative displacement of the card and the processor, even when the relative speeds of the card and the processor may vary.

An even further object of the present invention is to provide a card processing device in which the card is conveyed and the data can be processed according to the true displacement of the card with respect to the processor.

Another further object of the present invention is to provide a card processing device in which the data on the card can be processed accurately even if the card reverses its direction while it is being conveyed.

Another object of the present invention is to provide a card processing device in which the data on the card can be processed according to the true relative displacement of the card and the data reader, even though the relative speeds of the card and the reader may vary.

A further object of the present invention is to provide a conveyor-type card processing device in which the data can be read off the card according to the true displacement of the card with respect to the data reader.

An even further object of the present invention is to provide a card processing device in which the data can be read off the card accurately even if the card reverses its direction while it is being conveyed.

Another object of the present invention is to provide a card processing device in which non-uniformity in the rotation of the mechanism which transmits the drive force for the conveyance of the card can be minimized.

A further object of the present invention is to provide a card processing device in which the route along which the card is conveyed has fewer rollers providing a design that simplifies the device and reduces its cost.

An even further object of the present invention is to provide a card processing device in which a card which has been deformed by excessive conveying force can be conveyed normally.

Another object of the present invention is to provide a card processing device in which the conveyor rollers can apply considerable force to the card, and the structure of the conveyor can be simplified and designed to assure that conveying force is supplied in a stable manner.

A further object of the present invention is to provide a card processing device in which displacement can be detected normally even if a card is substantially deformed.

An even further object of the present invention is to provide a card processing device such that even before a card has passed the detector device, that device outputs a signal which is matched to the rotation of the drive source.

Another object of the present invention is to eliminate a separate detector device used to control the drive source in the prior art devices to reduce both the size of the card processor and its cost.

A further object of the present invention is to provide a card processing device in which a detection signal employed in processing is used in place of a separate control signal for the image reader which reads images off the surface of the card, thus allowing the elimination of the detection device dedicated to the image reader to reduce both the size of the card processor and its cost.

An even further object of the present invention is to provide a card processing device in which the existing drive source can be used when it is mounted in a device with a drive mechanism which is also used for other functions to reduce both the size of the card processor and its cost.

Another object of the present invention is to provide a card processing device in which the processor moves relative to the card to allow the data on the card to be processed according to the true displacement of the processor.

A further object of the present invention is to provide a card processing device in which a lead screw is used both to guide the movement of the processor and to transmit the drive force to allow the size of the card processor to be reduced.

An even further object of the present invention is to provide a card processing device in which the displacement of the processor is detected accurately by a simple structure.

Another object of the present invention is to provide a card processing device in which the data reader moves relative to the card to allow the data to be read in perfect conformity to the displacement of the data reader.

A further object of the present invention is to provide a card processing device in which a lead screw is used both to guide the movement of the data reader and to transmit the drive force to allow the size of the card processor to be reduced.

An even further object of the present invention is to provide a card processing device in which the displacement of the data reader is detected accurately by a simple structure.

Another object of the present invention is to provide a card processing device in which the inertial moment is minimized with respect to the detector rollers to improve the accuracy of detection and allow the size of the card processor to be reduced.

The present invention is directed to a card processing device with a processor which moves along with the card and processes data on that card as it is moving. This device is distinguished by the fact that it has a detection device which detects the displacement of the processor relative to the aforesaid card in a way which is directly dependent on the movement of either the card or the processor, and a converter device which converts the signal from the detection device to a reference signal for the processing of the aforesaid data.

The card processing device includes a conveyor device providing a route along which the card is conveyed for defining the processor. The detection device detects the displacement of the card in a way which is directly dependent on the movement of that card.

The card processing device detects the displacement of the card, and also detects the direction in which the card is moving. This card processing device also includes a device to stop the processing. If the detection device detects that the direction of the card's movement has been reversed, this device stops the processing of the data on the card.

The card processing device includes a data reader, which moves along with the card and reads the data written on the card as it is conveyed along its path. This device is distinguished by the fact that it has a device which detects the displacement of the data reader relative to the card in a way which is directly dependent on the movement of either the card or the data reader; and a device which corrects the data read by the data reader based on signals from the detector device.

The conveyor device defines a route along which the card is conveyed relative to the aforesaid data reader, and the detector device detects the displacement of the card in a way which is directly dependent on the movement of that card.

The detector device detects both the displacement of the card and the direction in which the card is moving, and includes a device to stop the reading of data. If the detector device detects that the direction of the card's movement has been reversed, this device stops the processor from reading the data on the card.

In the detector device, a portion of the mechanism transmitting drive power to the conveyor device defining the conveyor route includes worm gears.

The conveyor device is constructed of two pairs of rollers with one or both pairs of rollers supplied with drive power. The space between the two pairs of rollers is shorter than the route along which the card is conveyed.

The two pairs of rollers which define the conveyor device are positioned in such a way that they face both the processor and the portion of the card on which data is recorded.

The upper and lower rollers defining the two pairs of rollers exert elastic force radially. These rollers oppose one another above and below the route of the card, and are separated by a space whose vertical dimension is less than the thickness of the card. Drive force is supplied to both of these pairs of rollers.

The detector device includes rollers whose peripheral surfaces come in contact with the card. These rollers which are components of the detector device are positioned above and below the route of the card so as to squeeze the card between them. This detector device has a roller to propel the card forward which is supplied with drive force from the same drive source as are the conveyor rollers which constitute the route along which the card is conveyed. It also has an elastic member which supplies force to the pressure roller in the direction which will cause it to make contact with the detector roller, and a stop to constrain the movement of the pressure roller to within a specified range as it is displaced away from the detector roller.

The signal from the device which detects the displacement of the card is used as a reference signal to control the drive source.

The card processing device includes an image reader which reads images off the surface of the card. The signal from the detector device is used as a reference signal to control the image reader.

The card processing device includes an input power transmission device to accept the supply of drive force from the exterior of the device to convey the card on the route.

The card processing device includes a device which moves the processor with respect to the card. The detector device detects the displacement of the processor directly based on its current position.

The device to move the processor includes a female screw fixed to the processor and a male screw of a length which at least surpasses that of the range of movement of the processor, and which by engaging with the female screw supplies rotary force to it.

The device for detecting the displacement of the processor includes an array of elements to be detected, which is formed in the space traversed by the processor and a detector element, which is fixed to the processor, and which outputs a detection signal at the moment the position of the processor corresponds to that of each element to be detected.

The carding processing device includes a device which moves the data reader with respect to the card, and the detector device detects the displacement of the data reader directly based on its current position.

The device to move the data reader includes a lead screw mechanism with a female screw fixed to the data reader and a male screw of a length which at least surpasses that of the range of movement of the data reader, and which by engaging with the female screw supplies rotary force to it.

The device to move the data reader includes elements to be detected, which are provided at equal intervals along the path traversed by the data reader, and a detector element which is fixed to the data reader, which outputs a detection signal at the moment the position of the data reader corresponds to that of each element to be detected.

The device to move the data reader includes an input power transmission device to accept the supply of drive force from the exterior of the device to move the processor or the data reader.

The device to detect the displacement of the card includes elements, which generate signals related to displacement. These elements includes features for detection, which are provided at regular intervals on the peripheral surface, coaxial with the detector roller.

The features to be detected in the element to generate signals related to displacement are defined by reflective surfaces or non-reflective surfaces. Luminous elements and photodetector elements are provided on the peripheral surface of the element to generate signals related to displacement. These elements are oriented so that their angles of incidence and reflection are identical. The non-reflective surfaces can be defined by slits.

The features to be detected by the element to generate signals related to displacement are defined by two different colors of reflected light.

In the card processing device, relative movement is detected in a way which is directly dependent on the movement of the card or processor as they move relative to each other. The detection signal outputted by the detector is converted by the converter device to a reference signal to be used in processing the data on the card. Thus the reference signal for processing is created directly based on the movement of the card. Such a signal is not affected by the accuracy of the transmission mechanism or its operating condition.

The displacement of the card is detected in a way which is directly dependent on the movement of the card while it is being conveyed, and the detection signal outputted by the detector is converted by the converter device to a reference signal to be used in processing the data on the card. Thus, the reference signal for processing is created directly based on the movement of the card. Such a signal is not affected by the accuracy of the transmission mechanism or its operating condition.

The processing of the data on the card is stopped by a device for that purpose if the detector device detects the fact that the card has reversed its direction of travel. This scheme prevents data from being overwritten during the write-in process in a region of the card which already has data written on it. It insures that data will be written in properly.

The relative displacement is detected in a way which is directly dependent on the movement of the card or data reader, which are moving relative to one another. Thus, even if the speed of the card varies, the data read from the card can easily be corrected to usable data.

The displacement of the card is detected in a way which is directly dependent on the movement of that card as it is being conveyed, and the detection signal output by the detector is converted by the converter device to a reference signal which can be used in processing the data. Since the reference signal used to correct the data which have been read is based directly on the movement of the card, it will not be affected by the accuracy of the transmission mechanism or its operating condition.

The data which have been read off the card is erased by a device for that purpose if the card reverses its direction while data is being read. This scheme allows the accuracy of data-reading to be maintained even if the direction of the card is reversed by a faulty conveyor.

The drive force is supplied to the conveyor device defining course along which the card is conveyed through a transmission mechanism which includes a worm gear. Generally, the reduction ratio of the worm and worm toothed wheel in a worm gear is substantially greater than that of a combination of flat gears. The rotational velocity output by a worm toothed wheel varies by 5 to 10%. This degree of speed variation can be corrected by signal processing performed by the converter or correction device.

The course along which the card is conveyed consists of two sets of paired rollers. Data processing is performed on the card while it is between these two sets of rollers. This scheme obviates the need for a separate set of rollers to convey the card independently during processing, thus reducing the number of rollers needed.

The width of the conveyor rollers is made to be identical to that of the portion of the card used to store data and the rollers can supply substantial conveying force to the card. With this scheme, even deformed cards will not get hung up on the conveyor course. No rotational force will be transmitted onto the surface of the card, and the data on the card will be processed accurately.

Substantial pressure is exerted on the card by the elastic force of the peripheral surfaces of the conveyor rollers. Because drive force is supplied to both the upper and lower rollers, the force by which the card is conveyed is quite large. There is thus no need for elastic members or mechanisms such as levers to augment the force of the conveyor rollers in the direction in which they make contact with the card.

The pressure roller comes in contact with the detector roller which detects the displacement of the card even before a card has gone past the detector roller. Drive force is supplied to this pressure roller by the same drive source as serves the conveyor rollers. Thus, the detector roller detects the rotation of the drive source through the pressure roller even before a card has passed as far as the detector roller.

The detection signal output by the detection roller is used as a reference signal to control the drive source. This obviates the need for a device to generate a separate reference signal for the drive source.

The conveying force supplied from the exterior can be received through an input power transmission device, thus obviating the need for a built-in drive source.

The displacement of the card is detected directly by the processor as it moves with respect to the card, and the detection signal output by the detector is converted by the converter device to a reference signal which can be used in processing the data. Since the reference signal used to process the data on the card is based directly on the movement of the processor, it will not be affected by the accuracy of the transmission mechanism or its operating condition.

The drive force is furnished to the processor by a lead gear mechanism which also guides the movement of the processor. Thus, two separate components need not be furnished to serve the functions of guiding the processor and transmitting drive force to it.

The device to detect the displacement of the processor includes a detector element which is fixed to the processor and elements to be detected, which are furnished along the course travelled by the processor. In this way the displacement of the processor can be detected accurately by a simple structure.

The displacement of the card is detected directly by the data reader, which is moving with respect to the card, and the data which is read off the card is corrected by an error correction device with the help of the detection signal outputted by the detector. With this scheme, correction of the data which has been read is based on the movement of the data reader, so it is not affected by the accuracy of the transmission mechanism or its operating condition.

The drive force is furnished to the data reader by a lead gear mechanism which also guides its movement. Thus, two separate components need not be furnished to serve the functions of guiding the data reader and transmitting drive force to it.

The device to detect the displacement of the data reader includes a detector element which is fixed to the data reader and an array of elements to be detected, which are furnished along the course travelled by the processor. In this way the displacement of the data reader can be detected accurately by a simple structure.

The conveying force supplied from the exterior for the processor or data reader can be received through an input power transmission device, thus obviating the need for a built-in drive source.

There is no need to have an encoder coaxial with, but spatially removed from the detector roller. The moment of inertia of the detector roller is kept small and any variation of the speed of the detector roller can be minimized resulting in improved accuracy of detection. The features to be detected are simple to produce.

BRIEF DESCRIPTION OF THE DRAWINGS

FIG. 7 shows a timing chart for input and output signals for the same control unit during the write-in operation.

FIG. 8 shows how the slits function during detection of movement of the card.

FIG. 15 is a side elevational view of a data processing device according to the present invention.

FIG. 16 is a top planar view of the data processing device shown in FIG. 15.

FIG. 17 is a front side elevational view of the data processing device shown in FIG. 15.

FIG. 18 is a broken away detail top view of a portion of the drive for moving to card.

FIG. 22 is a side elevational view are lateral views showing how a bent card is conveyed in the card processing device according to the present invention.

FIG. 23 is a side elevational view showing how a bent card can becomed jammed by the mechanism shown in FIG. 22 when a stop is not provided.

DETAILED DESCRIPTION OF PREFERRED EMBODIMENTS

Figure 1:
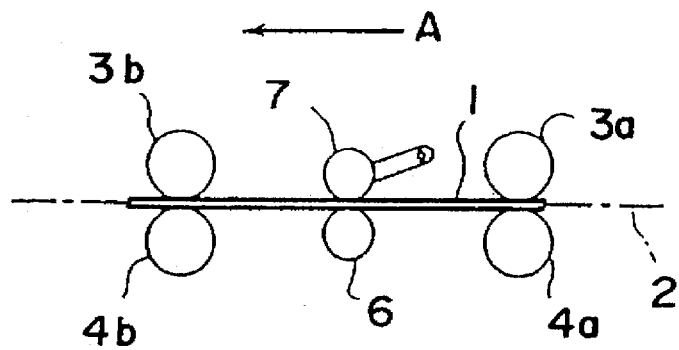
FIG. 1 is a side elevational view of the essential components of a card processing device which is one preferred embodiment of this invention.
Figure 2:
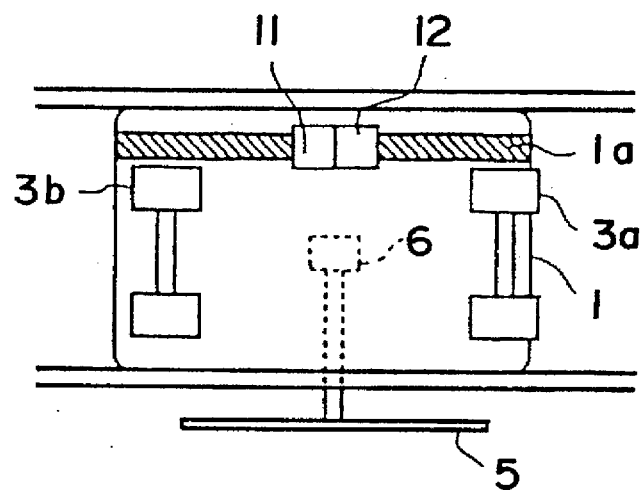
FIG. 2 is a top planar view of the card processing device shown in FIG. 1.

FIGS. 1 and 2 show the essential components of a card processing device which is a preferred embodiment of this invention.

Card 1 is conveyed in the direction indicated by arrow A on the conveyor course including drive rollers 3a and 3b and their corresponding driven rollers, 4a and 4b. Detector roller 6 and pressure roller 7 oppose each other on conveyor course 2 between the locations in which drive rollers 3a and 3b are installed. The rotation of drive rollers 3a and 3b conveys card 1 from a position between drive roller 3a and driven roller 4a to a position between pressure roller 7 and detector roller 6, and then to a position between drive roller 3b and driven roller 4b. Rotational force is transmitted to drive rollers 3a and 3b from a motor (not pictured) by way of a power transmission mechanism.

Reading head 11 and writing head 12 are positioned on conveyor course 2 so that they are facing magnetic strip 1a on card 1. Magnetically encoded data are read from or written onto the card by reading head 11 and writing head 12 via magnetic strip 1a. Encoder 5 is fixed onto the shaft of detector roller 6 so that it rotates along with detector roller 6. Detector roller 6 comes in contact with the bottom of card 1 as it moves along conveyor course 2, and is rotated by the movement of card 1 along course 2. Encoder 5, which is fixed to the shaft of roller 6, is therefore also rotated by the movement of card 1.

Figure 3:
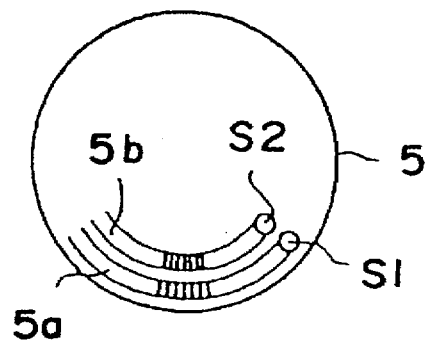
FIG. 3 is a side elevational view of the encoder in the card processing device.
Figure 4:
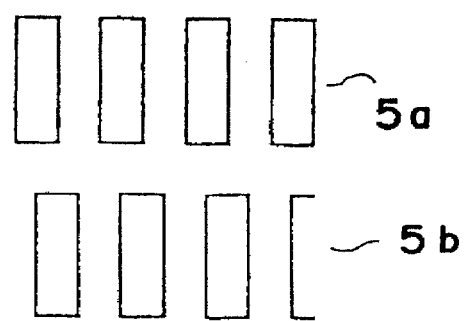
FIG. 4 is a diagrammatic view showing the slit arrangement of the encoder shown in FIG. 3.

FIGS. 3 and 4 show the encoder in the aforesaid card processing device and an enlargement of the rows of slits in that encoder. Rows of concentric slits 5a and 5b are formed at regular intervals near the perimeter of disk-shaped encoder 5. The slits in rows 5a and 5b are all of virtually the same width, and the spaces between them are of the same width as the slits. Photointerrupters $S_1$ and $S_2$ face rows 5a and 5b, respectively. Each photointerrupter is activated when a slit in the corresponding row is opposite the respective photointerrupter. The slits in row 5b face photointerrupter $S_2$ half a pitch later than the slits in row 5a face photointerrupter $S_1$.

With the configuration described above, a card 1 which is inserted into course 2 will be conveyed along that course in direction A by the rotation of drive rollers 3a and 3b. The movement of card 1 will cause detector roller 6, which comes in contact with the bottom of the card to rotate as well, and encoder 5, which is mounted on the same shaft as roller 6 will rotate with it. The rotation of encoder 5 will be detected by photointerrupters $S_1$ and $S_2$, thus the displacement of card 1 is detected.

Figure 5:
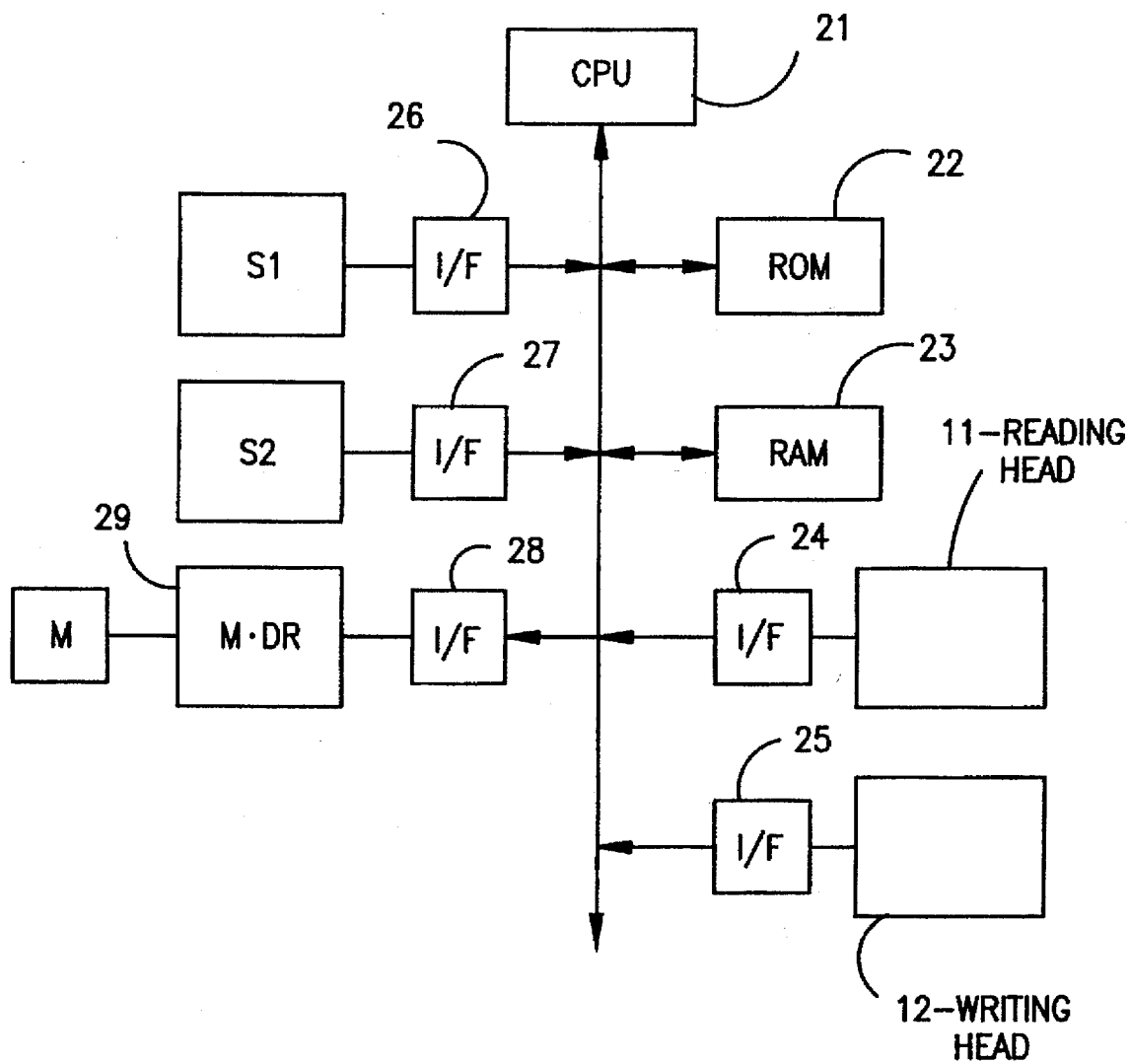
FIG. 5 is a block diagram of the control unit for the card processing device.

FIG. 5 is a block diagram of the control unit for the card processing device described above. In this control unit, reading head 11, writing head 12, photointerrupters $S_1$ and $S_2$ and motor driver 29 are connected to CPU 21, which has a ROM 22 and a RAM 23 via interfaces 24 through 28. The program which defines the operation of CPU 21 is pre-written into ROM 22. CPU 21 controls all input and output devices according to this program. Data to be input or output are stored in a specified memory area in RAM 23.

The magnetically encoded data which reading head 11 has read off magnetic stripe 1a on card 1 are inputted into CPU 21. CPU 21 stores the magnetically encoded data in RAM 23. CPU 21 supplies the data which is to be written onto card 1 to writing head 12 via interface 25. The data detected by photointerrupters $S_1$ and $S_2$ are inputted into CPU 21 by interfaces 26 and 27. CPU 21 detects the insertion of card 1 into course 2 by means of a sensor (not pictured), and it outputs drive data for motor M to motor driver 29 through interface circuit 28.

CPU 21 supplies the detection signal from photointerrupter $S_2$ to writing head 12 as a clock signal for the writing of data. When data is to be written onto card 1, CPU 21 outputs previously stored data into writing head 12, and head 12 writes the data onto card 1 using the detection signal from photointerrupter $S_2$ as a clock signal. When data recorded on card 1 is to be read, CPU 21 supplies a read-out signal to reading head 11. This signal is derived from the detection signal from photointerrupter $S_1$.

Figure 6:
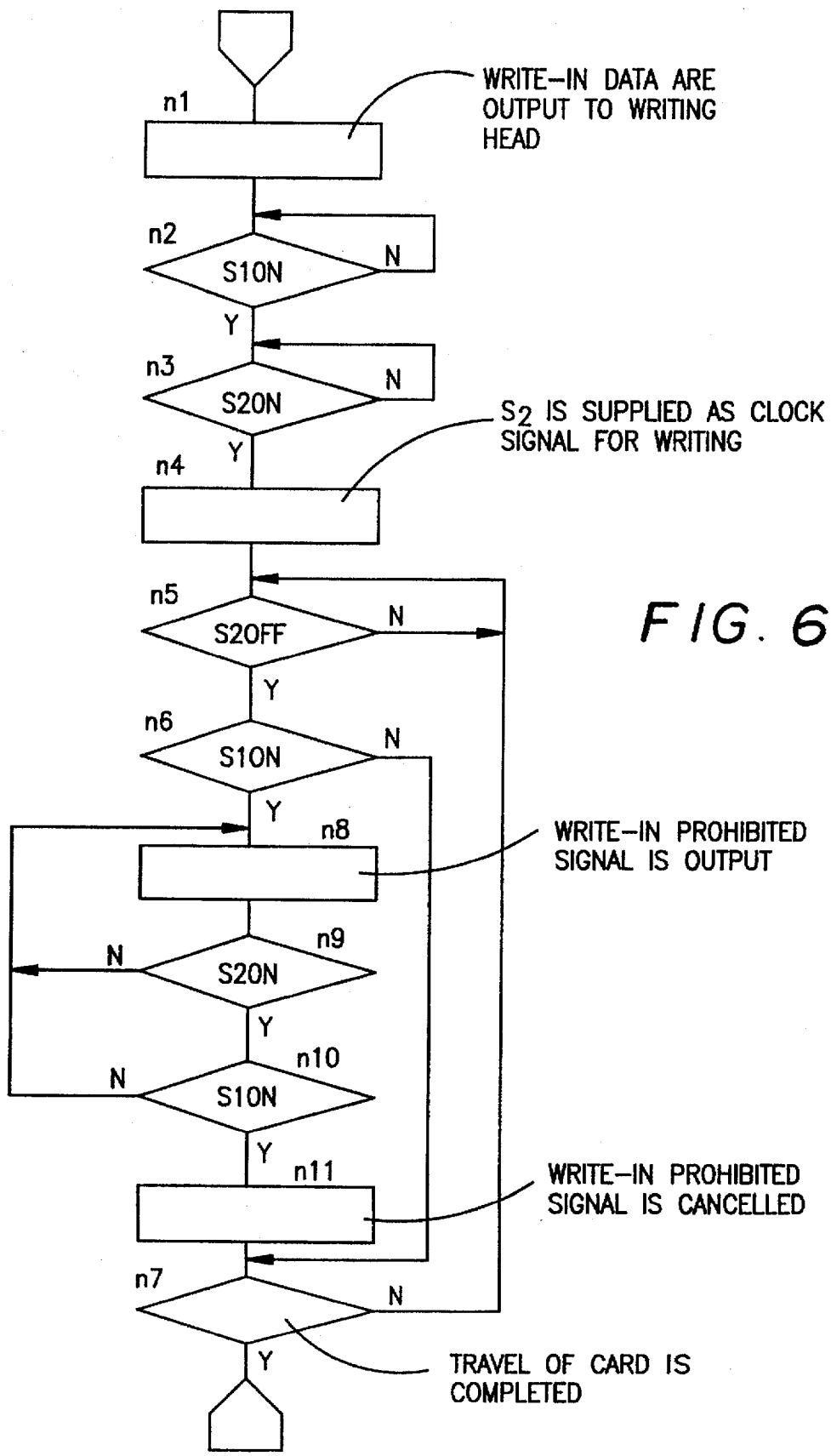
FIG. 6 is a flowchart of processes occurring in the control unit of the card processing device described above during the write-in operation.

FIG. 6 is a flowchart of processes occurring in the control unit of the card processing device described above during the write-in operation. To begin the write-in process, CPU 21 outputs to writing head 12 the write-in data which it has organized (n1). It waits for photointerruptors $S_1$ and $S_2$ to go on one after the other. The signal from photointerrupter $S_2$ is supplied to writing head 12 as a clock signal (n2 to n4). In this way writing head 12 begins to write data onto card 1.

Whenever the transport of card 1 is interrupted (n5 to n7), CPU 21 renders a judgment as to whether photointerrupter $S_1$ is activated while photointerrupter $S_2$ is off. If card 1 has completed its travel, this fact can be ascertained either from the detection signals from photointerrupters $S_1$ and $S_2$ indicating that the rotation of encoder 5 has stopped, or from a detection signal from a sensor (not pictured) mounted at the end of course 2.

If photointerrupter $S_1$ is on when photointerrupter $S_2$ is off, CPU 21 will conclude that there is something wrong with the way card 1 is being transported, and it will output a WRITE-IN PROHIBITED signal to writing head 12 (n5 and n6→n8). This causes head 12 to suspend the writing of data on card 1. CPU 21 continues to output this WRITE-IN PROHIBITED signal until photointerrupter $S_2$ is on at the same time that photointerrupter $S_1$ is on (n9 to n11). The aforesaid processing of steps n5 and n6→n8 corresponds to the device to stop the processing which is a part of this invention.

As is shown in FIG. 7, as long as card 1 is being conveyed normally along course 2 during write-in, output pulses from photointerrupter $S_2$ are supplied to writing head 12 as a clock signal for writing data.

If during the write-in process card 1 temporarily reverses its direction on course 2 due to a faulty conveyor, as shown by the dotted line in FIG. 8, the detection pulse from photointerrupter $S_1$ will still be high when that from photointerrupter $S_2$ is falling. The processes in steps n5 and n6→n8 discussed above will cause a WRITE-IN PROHIBITED signal to be output. This signal will be output continuously until the output signal from photointerrupter $S_2$ rises at a time when that from photointerrupter $S_1$ is already high. In this way, the fact that card 1 has reversed its direction can be detected based on the output pulses from photointerrupters $S_1$ and $S_2$. Since the operation of writing head 12 is interrupted under these circumstances, data is prevented from being overwritten on the portion of magnetic strip 1a where data have already been written in the normal fashion.

Figure 9:
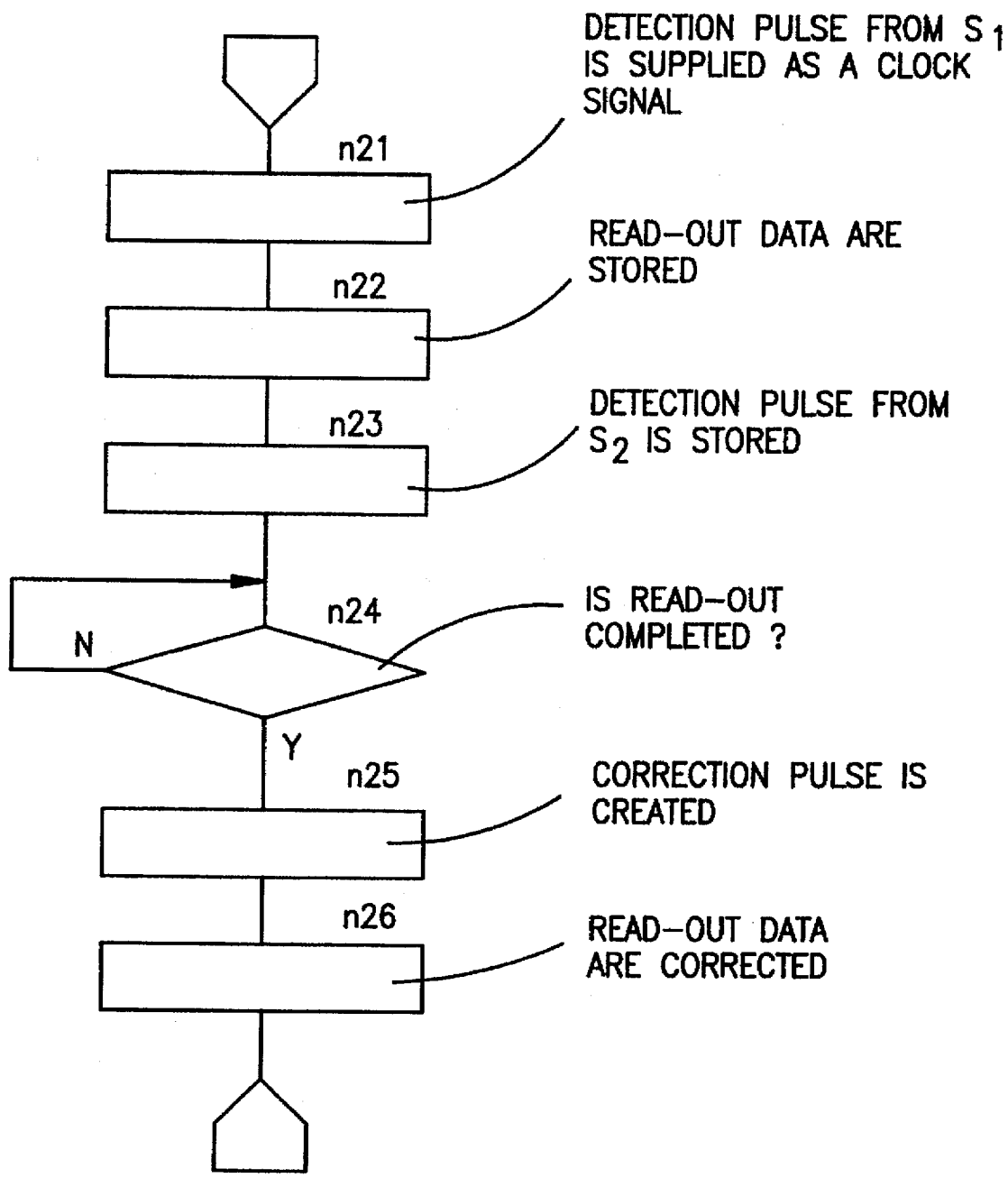
FIG. 9 is a flowchart of the processing performed in the card processing device during the read-out operation.

FIG. 9 is a flowchart of the processing performed in the aforesaid card processing device during the read-out operation. To read data, CPU 21 supplies output pulses from photointerrupter $S_1$ to reading head 11 as a clock signal by which to read out data (n21). CPU 21 stores both the data read out by reading head 11 and the output pulses from photointerrupter $S_2$ in RAM 23 (n22 and n23). When card 1 reaches the end of the course and the read-out of data is completed (n24), correction pulses are created based on the read-out data and the output pulses from photointerrupter $S_2$ which were stored in RAM 23 (n25), and the read-out data are corrected (n26).

Figure 10:
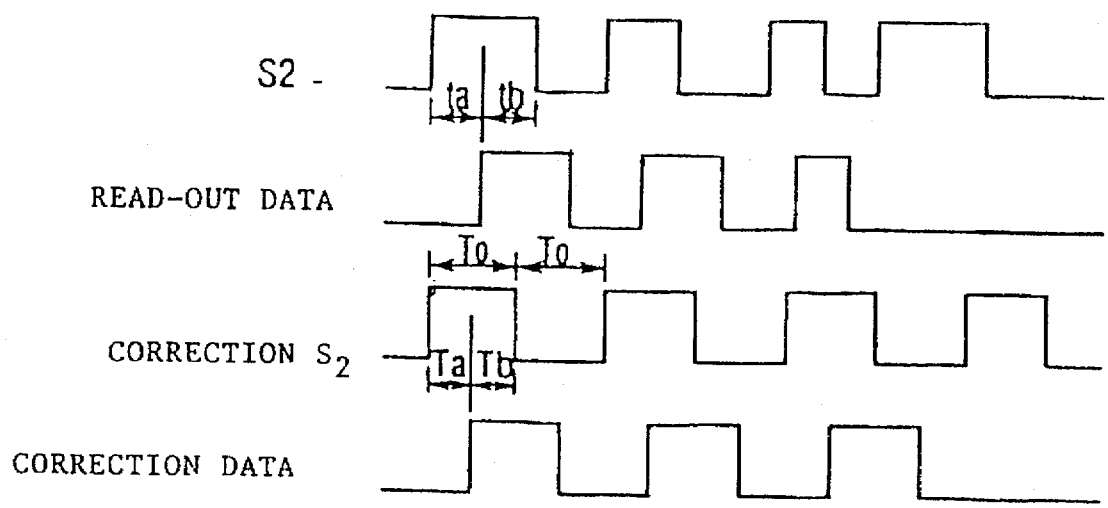
FIG. 10 is a timing chart for input and output signals for the same control unit during the read-out operation.

If, for example, as is shown in FIG. 10, the speed of card 1 on course 2 varies, the status of the card's movement will be stored in RAM 23 in the form of the output pulses from photointerrupter $S_2$. The data which have been read using the output pulses from photointerrupter $S_1$ as a clock signal will likewise be stored in RAM 23. For both the on and the off times of the read-out data, CPU 21 maintains the ratio of times before and after, with respect to the corresponding on or off transitions of the output pulse, before and after correction at ta:tb=Ta:Tb. The output pulse and the read-out data are corrected so that the on and off periods of the output pulse from photointerrupter $S_2$ all have fixed duration $T_O$. In this way the data read by head 11 can easily be corrected to read-out data with normal timing relationships which would have been obtained had card 1 travelled at a steady speed.

Figure 11:
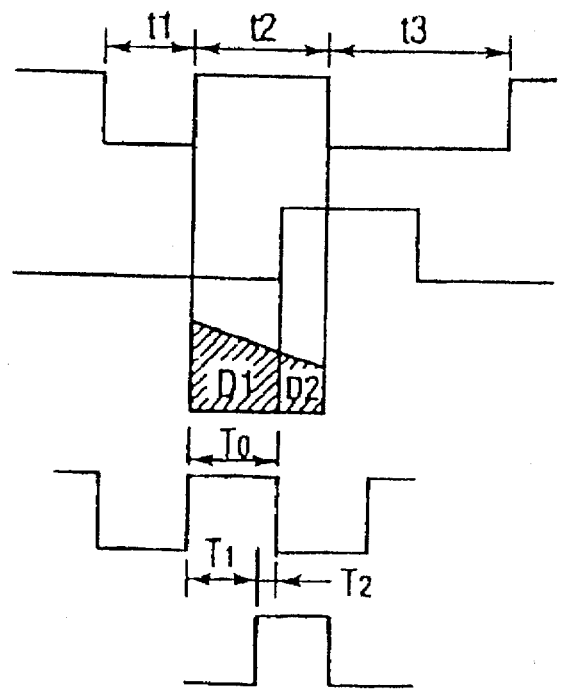
FIG. 11 is a timing chart showing the status of the signal processing during correction of read-out data in a card processing device which is another preferred embodiment of this invention.

As is shown in FIG. 11, the slope of the speed during photointerrupter $S_2$'s on and off periods is obtained from the lengths $t_1$ and $t_3$ of the previous and subsequent periods. The quantities of data $D_a$ and $D_b$ collected before the rise point and after the fall point of the read-out data in this period are obtained by calculating the areas. The length of each of photointerrupter $S_2$'s on or off period is made to be of a fixed duration $T_O$. These periods are divided by the ratio of the aforesaid quantities of data $D_1$ to $D_2$ ($D_1$:$D_2$=$T_1$:$T_2$) to yield the rise and fall points of the corrected read-out data. Treating the readout data in this way by matching the state of card 1's travel yields a highly accurate correction.

Figure 12:
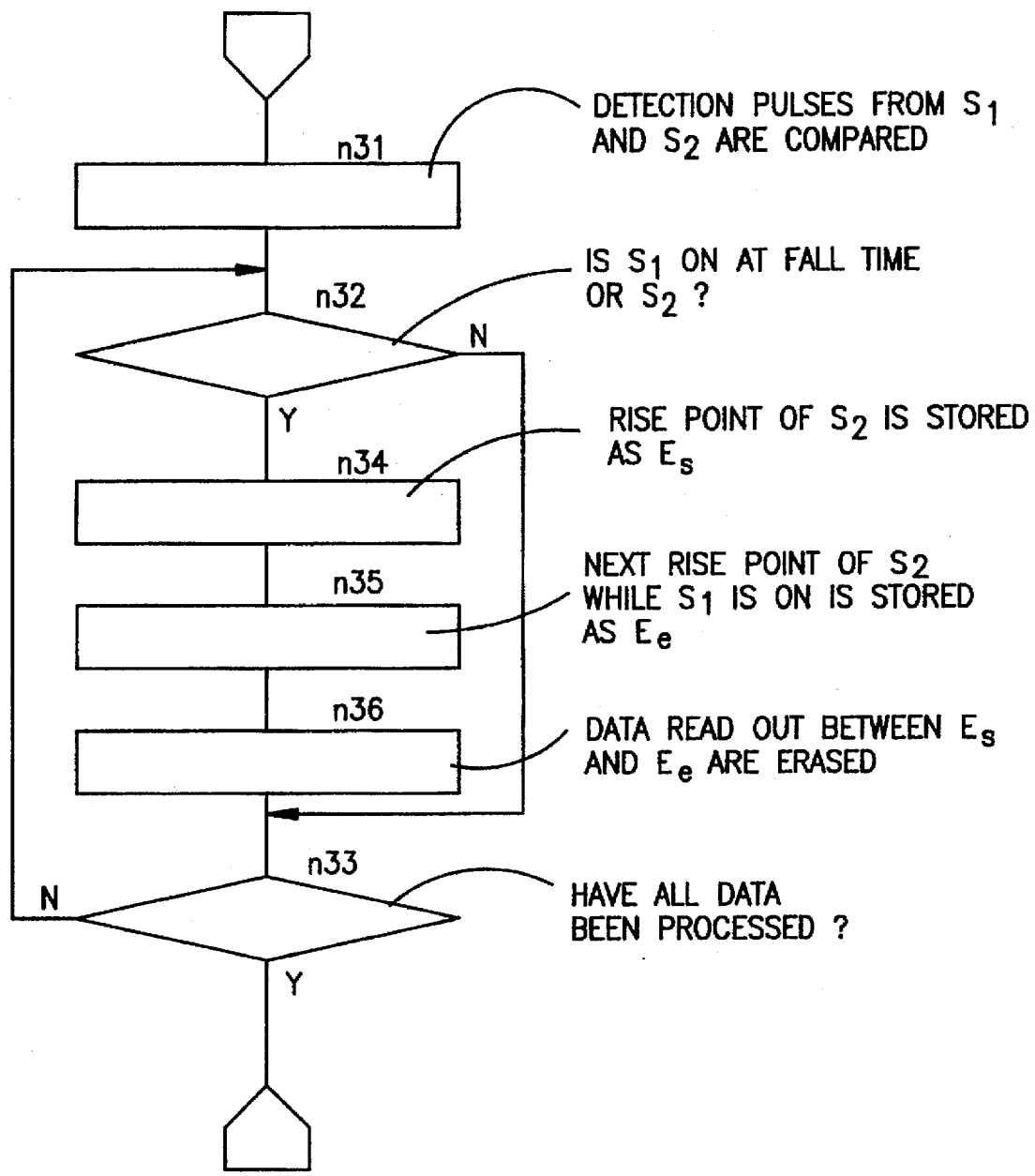
FIG. 12 is a flow chart for the process used by the control unit of the same card processing device to erase data read off the card.

FIG. 12 is a timing chart for the process used in the aforesaid card processing device to erase data read off the card after it has reversed its direction during read-out. CPU 21 stores all the data written on card 1 in RAM 23. It then compares the output pulses from photointerrupters $S_1$ and $S_2$, which are like wise stored in RAM 23 (n31). In this comparison, it checks all data as to whether photointerrupter $S_1$ was on at the rise time of the output pulse from photointerrupter $S_2$.

If there occurred an incident such that photointerrupter $S_1$ was on when the output pulse from photointerrupter $S_2$ began to rise, the point at which the output pulse from photointerrupter $S_2$ began to rise will be stored as the starting point $E_s$ from which the read-out data should be erased (n34). The next time at which the pulse from photointerrupter $S_2$ rises, while photointerrupter $S_1$ is on will be stored as the ending point $E_e$ for the erasing of the data (n35). Thus, the data read out between the stored starting and ending points $E_s$ and $E_e$ will be erased (n36). Steps n 32 and n 34 through n 36 correspond to the device to erase data which is a part of this invention.

Figures 13, 14:
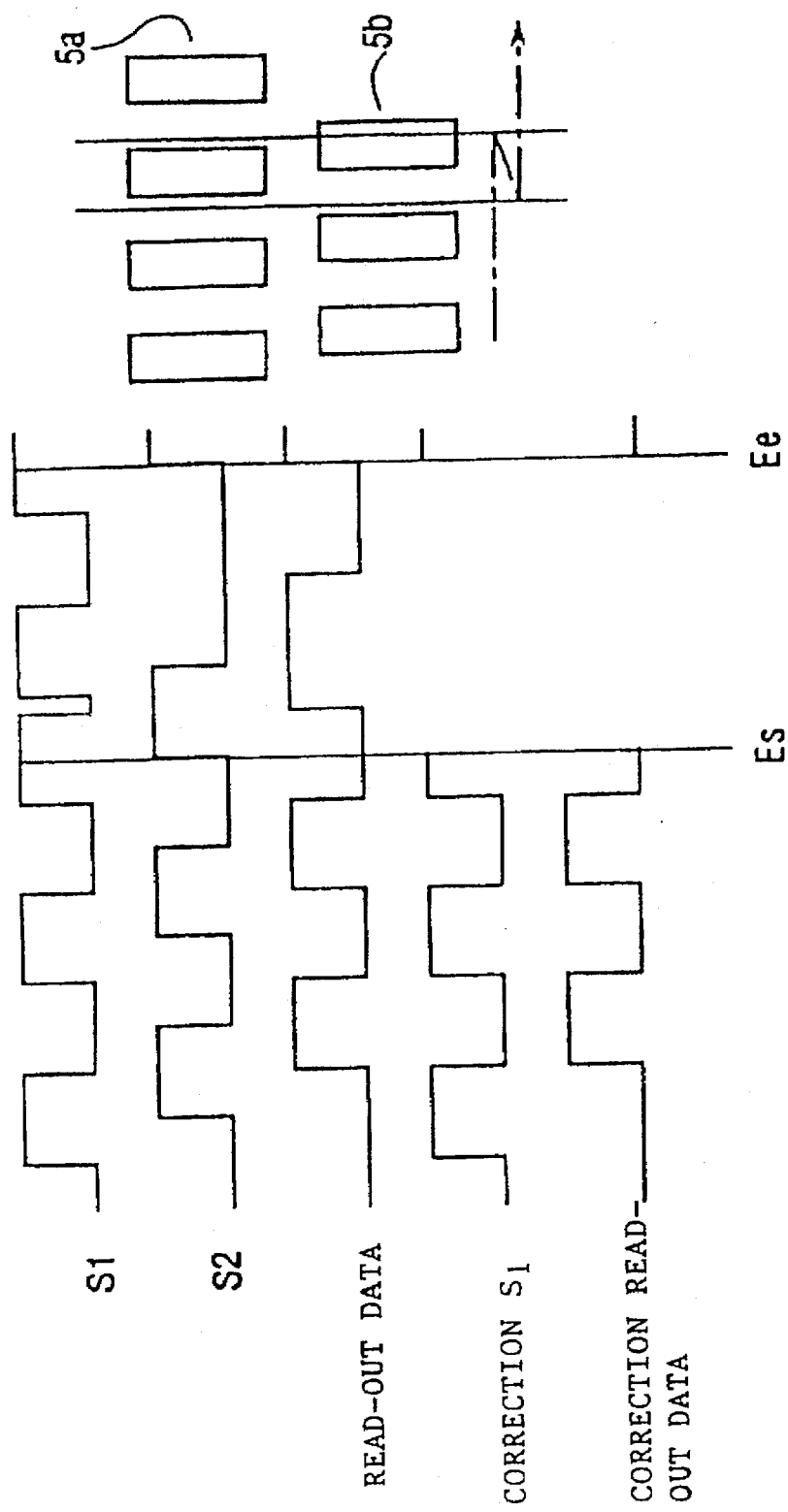
FIG. 13 shows a timing chart giving the status of each signal when data is being erased.
FIG. 14 shows how the slits function during detection of movement of the card.

If card 1 changes direction on course 2 while data is being read, encoder 5 reverses its direction of rotation as shown by the dotted line in FIG. 14. In the erasure process described earlier, CPU 21 erases the portion of the data read by head 11 which has been overwritten. Thus, the data will be read off the card accurately at all times regardless of the direction of travel of card 1.

FIGS. 15 to 18 are views showing the configuration of a data processing device which is a preferred embodiment of this invention from the rear, top, front and right sides. Card processing device 30 includes a front frame 47 and rear frame 48 and paired conveyor rollers 34 and 35 and 44 and 45, which are pivotally supported between frames 47 and 48. The two sets of rollers 34, 35 and 44, 45, constitute the course on which card 51 is conveyed. The space between rollers 34-35 and 44-45 is not as long as the entire path of card 51's travel. Magnetic head 38, which reads and writes data on the card, is installed in this space.

This configuration obviates the need for separate rollers which would convey card 51 only while its data is being processed by magnetic head 38. Simplifying the design of the device allows it to be reduced both in size and cost.

The rotation of motor 31 is transmitted to conveyor rollers 34, 35, 44 and 45 through timing pulleys 49 and cogged belts 50. Worm 32 is mounted on the rotating shaft of motor 31. Rotation is transmitted to timing pulley 49 through worm toothed wheel 33, which engages with worm 32.

This configuration allows any variations of the rotational velocity of motor 31, which is transmitted to timing pulley 49 to be minimized, which in turn minimizes non-uniformity in the rotation of conveyor rollers 34, 35, 44 and 45.

Conveyor rollers 34 and 44 and magnetic head 38 are positioned so as to make contact with the magnetic strip on card 51. In other words, rollers 34 and 44 and head 38 are arrayed in a straight line along the path traversed by card 51.

Figure 19:
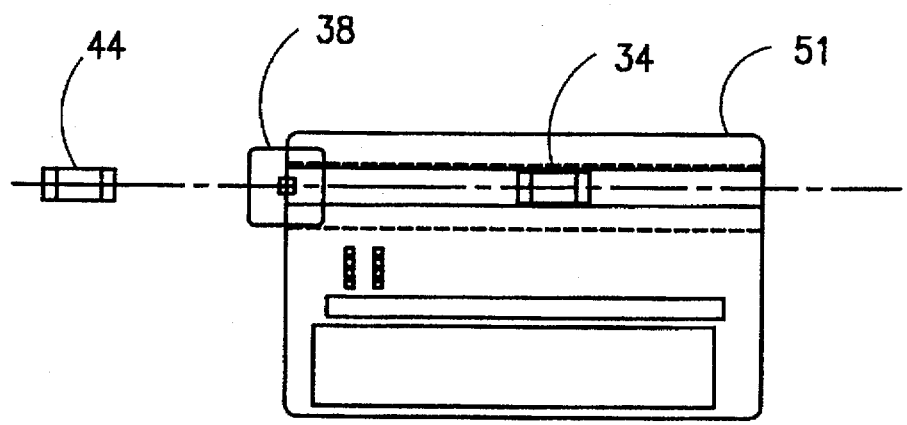
FIG. 19 is a to p planar view showing how a card is conveyed in the card processing device according to the present invention.
Figure 20:
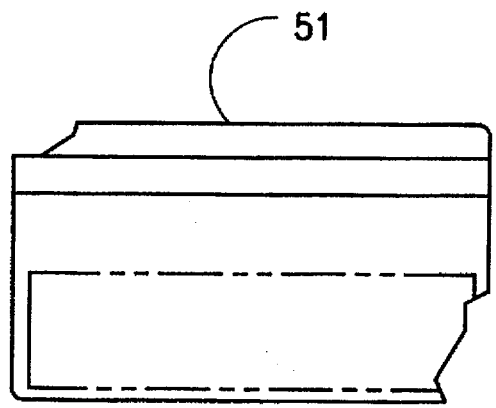
FIG. 20 is a top planar view of a damaged card that can be accommodated by the card processing device shown in FIG. 19.
Figure 21:
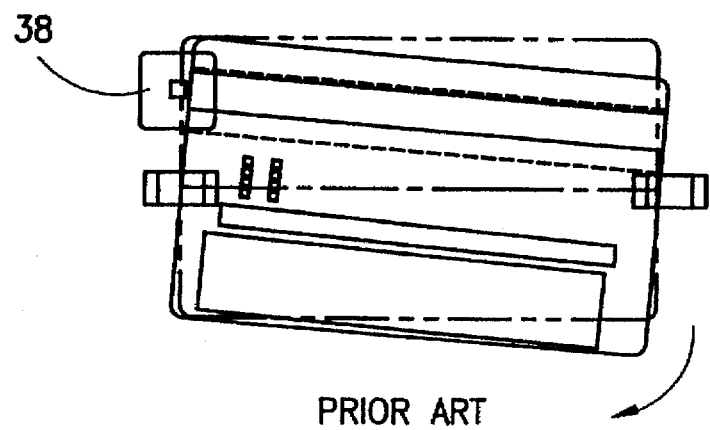
FIG. 21 is a top planar view showing how a card can become skewed in a prior art card processing device.

With this configuration, conveyor rollers 34, 35, 44 and 45 are the same width as the magnetic strip on card 51. Sufficient conveying force is used to insure that the card cannot move to a position where the embossed portion of card 51 can come in contact with the rollers, as shown in FIG. 19. Thus, even a mutilated card 51 like the one shown in FIG. 20 will be conveyed normally. This arrangement prevents a problem which occurred with previous card processing devices, namely that frictional resistance would sometimes cause a card to rotate horizontally when it is in contact with magnetic head 38 with the result that the magnetic strip moved away from the head.

Conveyor rollers 34, 35, 44 and 45 are rubber rollers which are composed of a material which gives them substantial elastic force in a radial direction. When card 51 is not between them, upper rollers 34 and 44 are in contact with lower rollers 35 and 45, respectively. When card 51 is being conveyed, the perimeter surfaces of rollers 34, 35, 44 and 45 are elastically deformed in a radial direction by the portion of card 51 with which they are in contact.

It is known that generally speaking, the lower the hardness of an elastic substance, the greater the coefficient of friction will be. It is also known that when pressure is exerted on contacting rollers by springs or other elastic components, the greater the pressure, the larger will be the deviation in rotational position between the rollers.

In this embodiment, conveyor rollers 34, 35, 44 and 45 are sufficiently elastic along their radial directions that substantial conveying force is conferred to card 51, so that there is no need for additional components to exert pressure on the upper and lower rollers. This scheme minimizes deviations in rotational position between rollers. Since it simplifies the configuration of the device, it reduces both its size and its cost.

Detector roller 37 and pressure roller 39 are mounted in the same location as magnetic head 38 along the path of card 51. Detector roller 37 and pressure roller 38 come in contact with the front and the back of card 51, respectively. An optical chopper including two photointerrupters and encoder 46 is mounted on the same shaft as detector roller 37. The photointerrupters detect the slits which are provided at regular intervals on the encoder wheel, which rotates along with detector roller 37.

Pressure roller 39 is pivotally supported at one end of lever 40, which is anchored at its midpoint in such a way that it can swing back and forth. Rotational force which is identical to that of conveyor roller 35 is supplied to roller 39 through belt 36. On the other end of lever 40 is spring 41, which exerts elastic force downward, causing pressure roller 39 to come in contact with detector roller 37. Stop 42 comes in contact with the top of the same end of lever 40. This scheme limits the travel of pressure roller 39 away from detector roller 37 to within a specified range.

With this configuration, as shown in FIG. 22, the elastic force of spring 41 transmitted through pressure roller 39 causes card 51 to exert pressure on detector roller 37. The displacement of card 51 can then be detected by roller 37.

It is conceivable that a card 51 which was bent excessively, as shown in FIG. 23, would resist the elastic force of spring 41 and push pressure roller 39 downward so that detector roller 37 did not make contact with card 51. If in anticipation of this circumstance the elastic force of spring 41 were augmented somewhat, the mechanical components such as lever 40 would also have to be upgraded sufficiently to counterbalance the force of the spring, and the size of the device might have to be increased.

Figure 24:
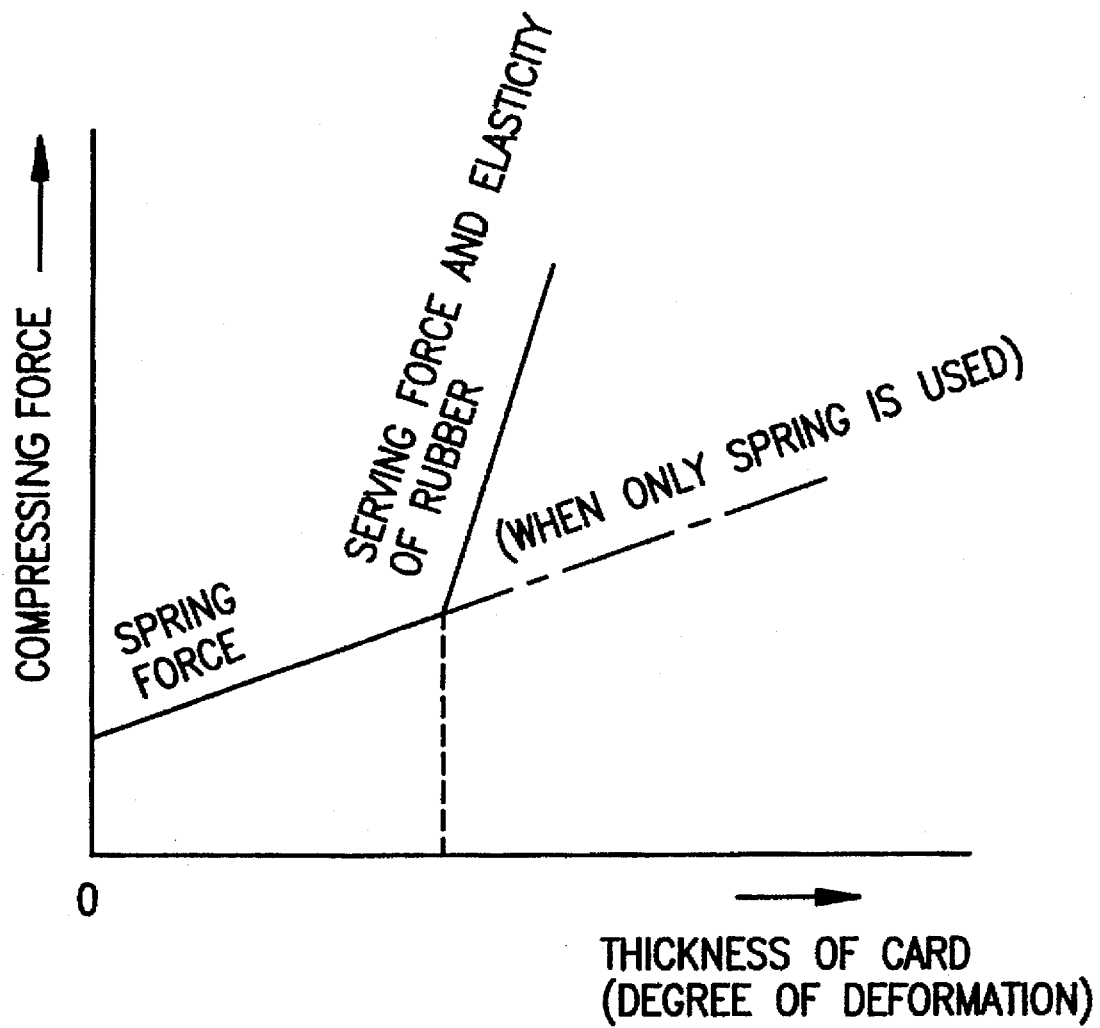
FIG. 24 is a graph showing the compressive force applied to the card by the pressure roller in the card processing device according to the present invention.

The use of stop 42 limits the downward movement of pressure roller 39, which cannot move downward beyond its specified range even if a substantially bent card 51 is being conveyed through the processing device. Thus, detector roller 37 will under all circumstances make contact with card 51. As is shown in FIG. 24, if the degree of deformation of card 51 is such that lever 40 does not come in contact with stop 42, the elastic force of spring 41 will press card 51 against detector roller 37. If card 51 is so deformed that lever 40 comes in contact with stop 42, the combination of the elastic force exerted by spring 41 and elastic force exerted radially by pressure roller 39 will press card 51 against detector roller 37.

Since this scheme does not require that spring 41 have a very substantial elastic force, the structural components on the periphery of pressure roller 39 can be small.

Even when no card is being conveyed, pressure roller 39 remains in contact with detector roller 37. Since the rotation of motor 31 is transmitted to pressure roller 39, detector roller 37 will detect that rotation when no card is being conveyed. Thus, the detection signal from encoder 46, which is mounted on the same shaft as detector roller 37 can be applied to control the drive of motor 31. With this scheme, there is no need for a separate device to detect the rotation of motor 31.

As is shown in FIG. 15, card processing device 30 may have an image reader 43 to read images off the surface of card 51. In this case, the detection signal from encoder 46 can be used as a reference clock signal to control image reader 43.

Figure 25:
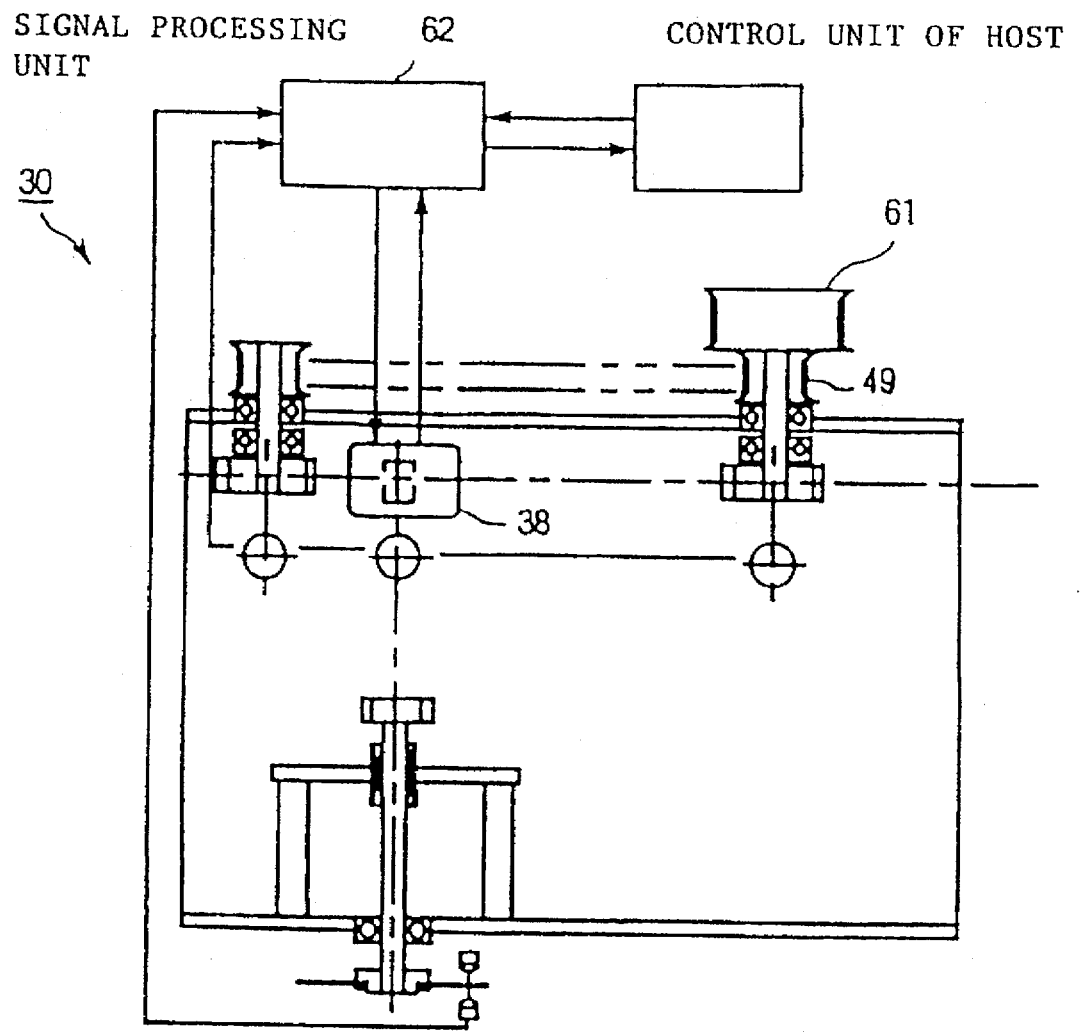
FIG. 25 is a detailed top planar view showing the configuration of a preferred embodiment of a card processing device which is a preferred embodiment of the invention.

FIG. 25 is a plan view showing the configuration of a preferred embodiment of a card processing device suitable to be built into a host device. In place of motor 31, which was pictured in FIG. 15, this device has power transmission unit 61, which consists of a pulley or gear coaxial with timing pulley 49. Power transmission unit 61 transmits the rotation of the motor in the host device to the interior of card processing device 30, which is an ATM or the like. In this case signal processing unit 62 in card processing device 30 is connected to the control unit in the host device through an interface (not pictured). Data is read off or written onto the card via magnetic head 38.

Figure 26:
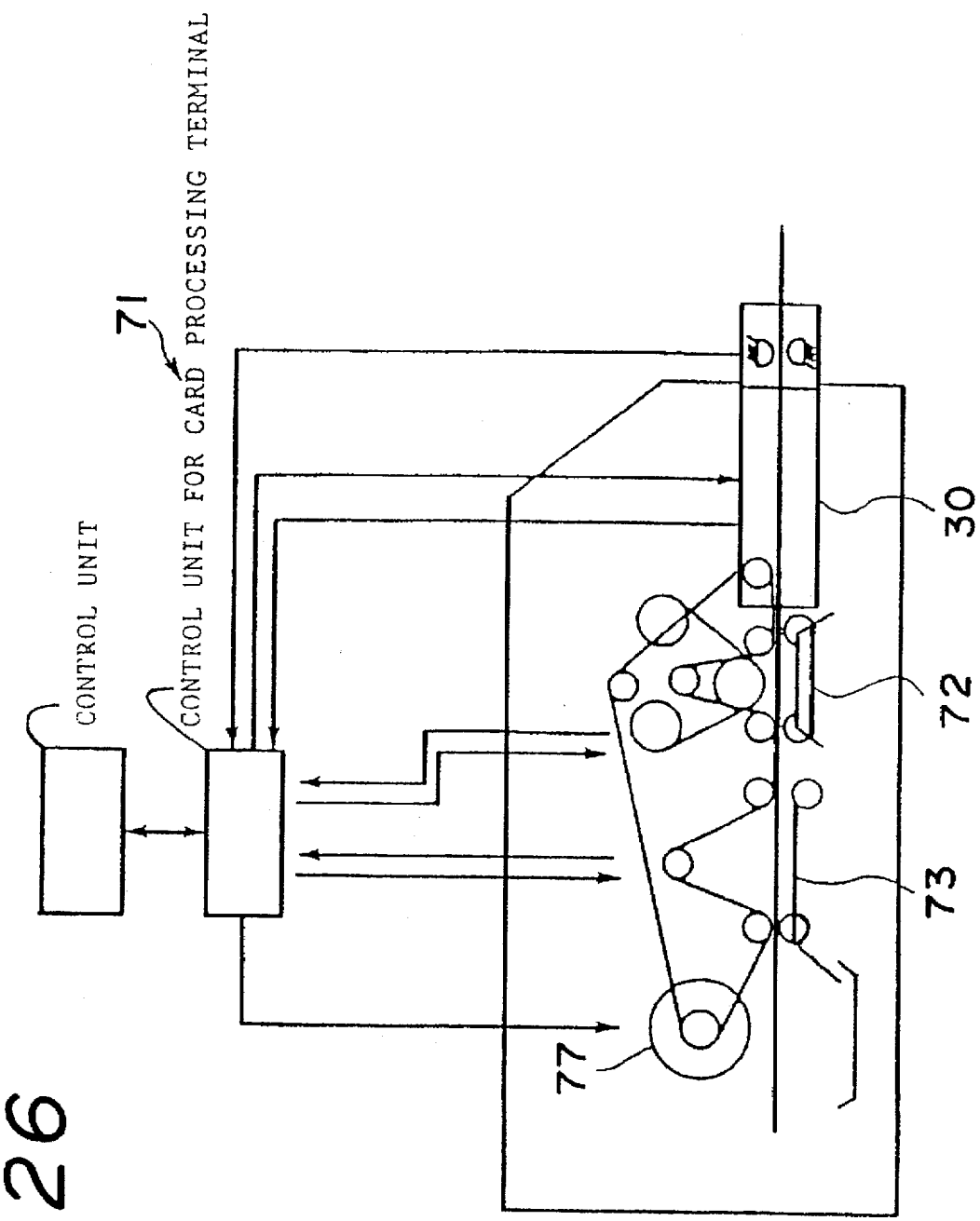
FIG. 26 is a diagrammatic side elevational view showing the shows essential aspects of the configuration of the host device in which that same card processing device is housed.

Such a scheme is pictured in FIG. 26. ATM 71 supplies conveying force to card processing device 30 through motor 77, which is furnished to convey cards through imprinting unit 72 and issuing unit 73. The control of the processing can be simplified if it is performed by the control unit for ATM 71. This scheme obviates the need for a small DC motor whose only use is to drive card processing device 30. It thus enhances the service life of the device and simplifies maintenance inspections.

Figure 27:
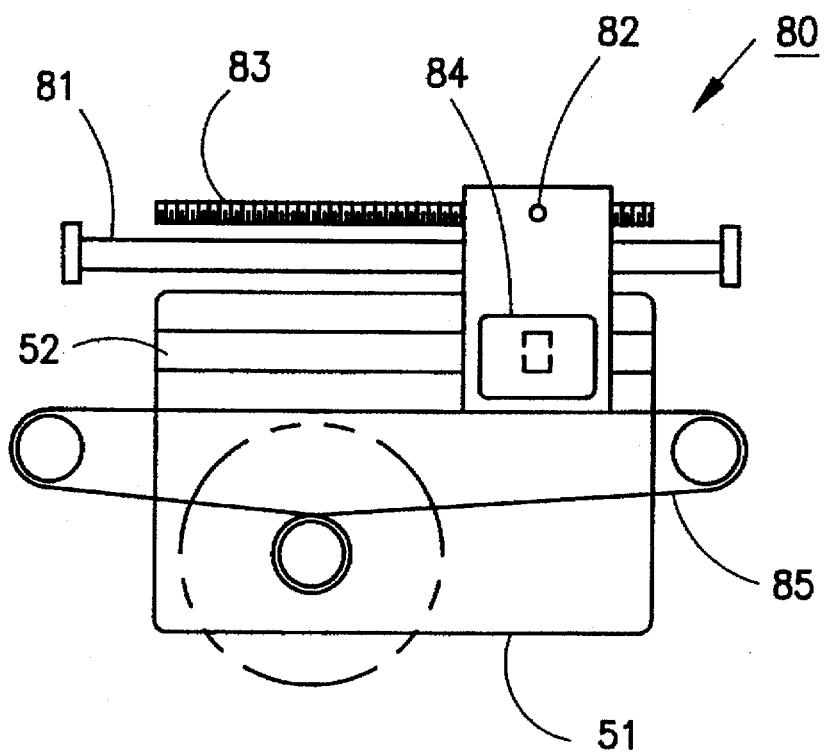
FIG. 27 is a top planar view of the main components of a card processing device which is a preferred embodiment of the invention.

FIG. 27 is a plan view of the main components of a card processing device which is another preferred embodiment of this invention. Card processing device 80 has a magnetic head 84 which scans magnetic strip 52 on card 51. Magnetic head 84 engages with guide 81, which runs parallel to magnetic stripe 52. The rotation of motor 86 is transmitted through belt 85. Magnetic head 84, which detects the magnetic strip on card 51, is provided with a photointerrupter 82 and encoding slit 83, which runs parallel to guide 81.

Figure 28:
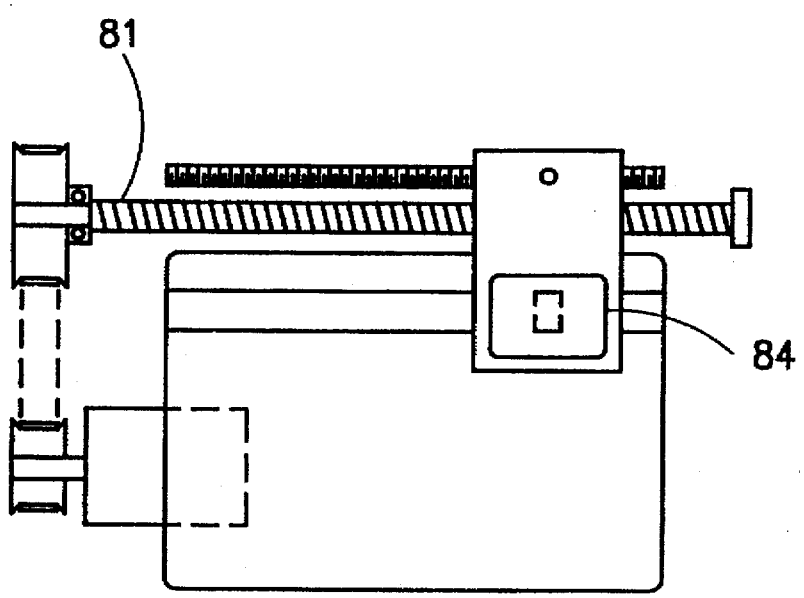
FIG. 28 is a top planar view showing the essential configuration of a card processing device which is a preferred embodiment of the invention.

With this configuration, the displacement of magnetic head 84 with respect to card 51 can be detected by means of the output from photointerrupter 82. As shown in FIG. 28, a male screw thread is formed on guide 81, and a lead screw mechanism with a female screw which engages with this male screw is also furnished with guide 81. In this way the lead screw serves both to guide the movement of the magnetic head and to transmit drive force to it, thus simplifying the configuration of the device.

When card processing device 80 is built into a host device such as an ATM, drive force may be transmitted to magnetic head 84 by the motor in the host device.

Figure 29:
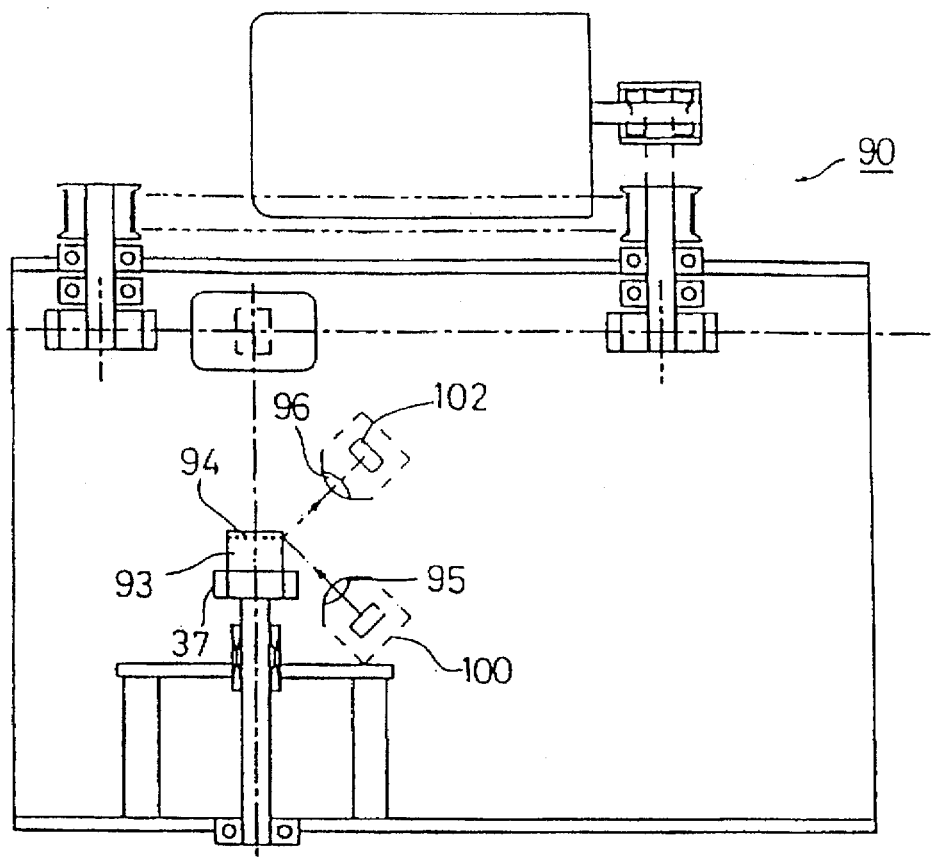
FIG. 29 is a top planar view showing the essential configuration of a card processing device which is a preferred embodiment of the invention.
Figure 30:
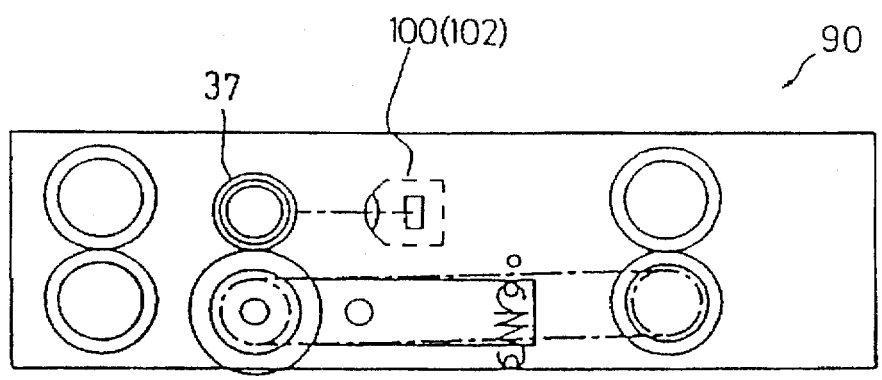
FIG. 30 is a side elevational view of the card processing device shown in FIG. 29.

FIG. 29 shows plan and frontal views of a card processing device which is a preferred embodiment of the invention. The card processing device 90 pictured in FIG. 29 has a tubular protruding drum 93 on the side of and coaxial with detector roller 37, which is also pictured in the configuration shown in FIG. 15. The peripheral surface of protruding drum 93 is fashioned into a reflective surface, on which indentations 94 are provided at regular intervals. Facing these indentations 94 are luminous element 100 and photodetector element 102, which are positioned so that their angles of incidence and reflection are identical. The light emitted by luminous element 100 passes through lens 95 and is reflected by the reflective surface of protruding drum 93. It then passes through lens 96 and strikes photodetector element 102. Thus, luminous element 100, photodetector element 102, and indentations 94 comprise the encoder which detects the rotation of detector roller 37.

Indentations 94, which constitute the encoder to detect the rotation of detector roller 37, are provided on a portion of that same roller. This scheme provides a reduced moment of inertia for detector roller 37 as compared with the scheme shown in FIG. 11, in which encoder 16 is coaxial with but physically removed from detector roller 37, and it allows roller 37 to rotate more easily. Since the encoder components can be placed within the boundaries of the course travelled by card 51, this scheme allows the size of the device to be reduced.

In place of indentations 94, slits may be provided at regular intervals on the peripheral surface of protruding drum 93, or strips of a dark color may be used to create the same effect.

Figure 31:
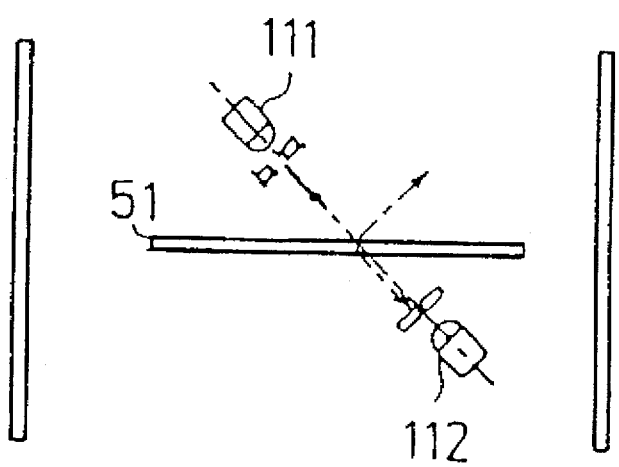
FIG. 31 is a side elevational view showing how the sensor which detects the card is mounted in the card processing device which embodies present invention.
Figure 32:
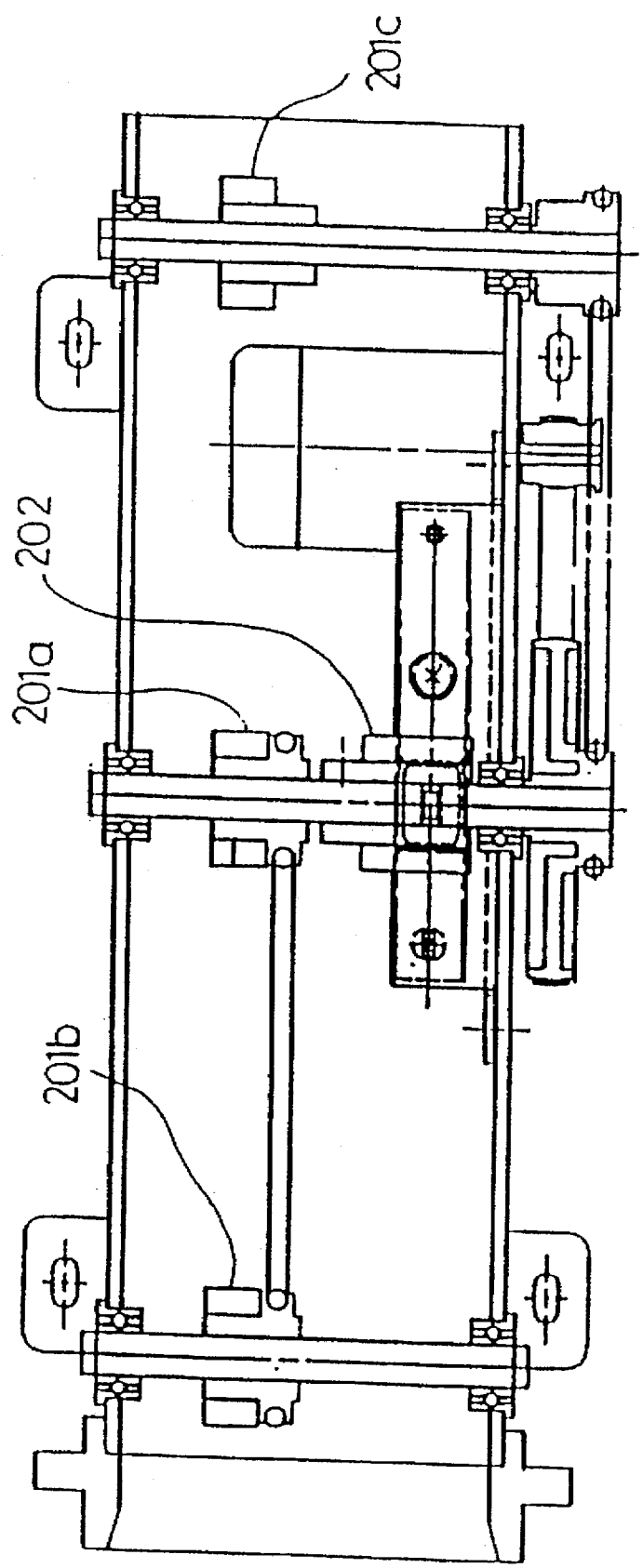
FIG. 32 is a transverse top cross-sectional view of a prior art card processing device.

In the card processing device there are sensors which indicate the card's progress or detect its position along the course. These sensors are generally composed of a luminous element and a photodetector element. As is shown in FIG. 31, luminous element 111 and photodetector element 112 are placed so that the optical axis between them is oblique with respect to the surface of the course. This arrangement increases the proportion of the light emitted by luminous element 111 which is reflected by the surface of card 51. Further, refraction within card 51 of any transmitted light shifts the optical axis. Therefore, the quantity of light emitted by element 111 and the detection level of element 112 need not be fine-tuned. Even a transparent card 51 can be detected accurately. With this arrangement, there will be no danger that card 51 will fail to be detected because wear and tear has reduced the quantity of light which element 111 emits or because of dust spots on element 112, and the service life of element 111 will be extended.

With the invention described above, the reference signals to time processing can be created directly based on the movement of the card. The processing of the card is simplified, and its accuracy is not dependent on the accuracy of the transmission mechanism or its operating condition.

With the invention, the reference signal for processing can be created directly based on the movement of the card.

With the invention, the processing of the data on the card can be stopped by a device for that purpose if the detector device detects the fact that the card has reversed its direction of travel. This scheme prevents data from being overwritten during the write-in process in a region of the card which already has data written on it. It insures that data will be written in properly.

With the invention, even if the speed of the card varies, the data read from the card can easily be corrected to a usable condition.

With the invention, the reference signal used to correct the data which has been read is based directly on the movement of the card. Thus, it will not be affected by the accuracy of the transmission mechanism or its operating condition.

With the invention, the accuracy of data-reading can be maintained even if the direction of the card is reversed in the midst of its travel by a fault in the conveyor process.

With the invention, any variations in speed due to variations in the drive force transmitted to the conveyor device can be kept within a level which can be corrected by signal processing performed in the aforesaid converter device or correction device.

With the invention, there is no need for a separate set of rollers to convey the card independently during processing, thus reducing the number of rollers needed.

With the invention, even deformed cards will not get hung up within the conveyor course. No rotational force will be transmitted onto the surface of such cards, and the data on these cards can be processed accurately.

With the invention, substantial pressure can be exerted on the card by the elastic force of the peripheral surfaces of the conveyor rollers. Drive force is supplied to both upper and lower rollers. There is no need for elastic members or mechanisms such as levers to augment the force of the conveyor rollers in the direction along which they make contact with the card.

With the invention, the detector roller can detect the rotation of the drive source even before a card has reached it.

With the invention, the detection signal output by the detector roller can be used as a reference signal to control the drive source. This obviates the need for a separate device to generate a reference signal for the drive source.

With the invention, the detection signal output by the detection roller can be used as a reference signal to control an image reader which reads images off the surface of the card. This obviates the need for a separate device to generate a reference signal for the image reader.

With the invention, conveying force supplied from the exterior can be received through an input power transmission device, thus obviating the need for a built-in drive source.

With the invention, the reference signal used to process the data on the card can be based directly on the movement of the processor, so its accuracy will not be dependent on the accuracy of the transmission mechanism or its operating condition. Card data can be processed easily and accurately.

With the invention, two separate components need not be furnished to serve the functions of guiding the processor and transmitting drive force to it. The scheme used simplifies the configuration of the device and allows it to be made smaller.

With the invention, the device to detect the displacement of the processor consists of a detector element which is fixed to the processor, as well as an array of elements to be detected, which is furnished along the course travelled by the processor. In this way the displacement of the processor can be detected accurately by a simple structure.

With the invention, correction of the data which has been read is based on the movement of the data reader, so its accuracy is not affected by the accuracy of the transmission mechanism or its operating condition. Data can be read off the card easily and accurately.

With the invention, two separate components need not be furnished to serve the functions of guiding the data reader and transmitting drive force to it. This simplifies the configuration of the device and allows it to be made smaller.

With the invention, the displacement of the data reader can be detected accurately by a simple structure.

With the invention, conveying force supplied from the exterior of the processor or data reader can be received through an input power transmission device, thus obviating the need for a built-in drive source. This allows the device to be made smaller.

With the invention, there is no need to have an encoder coaxial with, but spatially removed from the detector roller. The moment of inertia of the detector roller can be kept small and the variability of the speed of the detector roller can be minimized, resulting in improved accuracy of detection.

With the invention, the features to be detected are simple to produce.

This device has a detector roller 6, which comes in contact with the bottom of card 1 as it is conveyed along course 2 by drive rollers 3a and 3b, and an encoder 5, which is mounted on the shaft of detector roller 6. It also has two photointerrupters which detect the rows of slits provided in encoder 5. When card 1 moves, detector roller 6 rotates, and encoder 5 rotates along with it. The rotation of encoder 5 is detected by the photointerrupters.

We claim:

1. A magnetic card data processing device for processing data on a card having a magnetic strip, comprising:

a base;

a magnetic head for processing data on the magnetic strip of the card, said magnetic head is supported by said base;

a card driving device for moving the card relative to said magnetic head and along a card path located adjacent to said magnetic head, said card driving device is supported by said base, said card driving device comprising two pairs of driving rollers with each pair of driving rollers defined by one driving roller located above the card path and another driving roller located below the card path, said magnetic head and said two pairs of driving rollers are aligned with the magnetic strip of the card to prevent skewing of the card during movement; and a card detecting device including a pair of rollers whose peripheral surfaces come in contact with the card and are positioned above and below the card path in a manner so as to squeeze the card therebetween, said pair of rollers of said card detecting device are driven by a drive belt also driving said two pairs of driving rollers of said card driving device, said pair of rollers of said card detecting device are provided with elastic roller covers to prevent slipping, and one roller of said pair of rollers of said card detecting device is spring biased on one side of the card forcing the card into contact with an opposite roller Of said pair of rollers of said card detecting device.

2. A device according to claim 1, including a converting device for converting a detection signal from said detecting device to a reference signal for processing the data on the card.

3. A device according to claim 2, wherein said card detecting device also detects the direction in which the card is moving and stops processing of the data on the card in the event said card detecting device detects that the direction of the card's movement has been reversed.

4. A device according to claim 2, including a device for correcting data read by said magnetic head based on signals from said card detecting device.

5. A device according to claim 2, wherein said card detecting device detects both the displacement of the card and the direction in which the card is moving and stops the reading of data in the event said card detecting device detects that the direction of the card's movement has been reversed.

6. A device according to claim 1, wherein said card driving device comprises worm gears.

7. A device according to claim 5, wherein said card driving device comprises worm gears.

8. A device according to claim 1, wherein said two pairs of driving rollers are set apart a distance shorter than a length of the card.

9. A device according to claim 5, wherein said two pairs of driving rollers are set apart a distance shorter than a length of the card.

10. A device according to claim 6, wherein said two pairs of driving rollers are set apart a distance shorter than a length of the card.

11. A device according to claim 8, wherein each pair of driving rollers are vertically aligned on either side of a horizontally aligned card path.

12. A device according to claim 11, wherein said two pairs of drive rollers are each defined by an upper drive roller and a lower drive roller constructed to exert elastic force radially outwardly, said upper roller and said lower roller oppose one another above and below the card path, and are separated by a space whose vertical dimension is less than the thickness of the card.

13. A device according to claim 2, including a stop to limit movement of said one roller of said pair of rollers of said card detecting device to within a specified range as it is displaced away from said other roller of said pair of rollers of said card detecting device.

14. A device according to claim 13, wherein a signal from said card detecting device which detects the displacement of the card is used as a reference signal to control said card driving device.

15. A device according to claim 2, including an image reader which reads images off a surface of the card, wherein a signal from said card detecting device is used as a reference signal to control said image reader.

16. A device according to claim 1, wherein said card driving device includes an input power transmission device connected to a drive source.

17. A device according to claim 13, wherein said card detecting device comprises elements which generate signals related to displacement of the card, said elements comprising means for detecting displacement provided at regular intervals on a peripheral surface coaxial with at least one roller of said pair of rollers of said card detecting device.

18. A device according to claim 17, wherein said means for detecting displacement comprise reflective surfaces and non-reflective surfaces, luminous elements and photodetector elements provided on a peripheral surface of said elements which generate signals related to displacement, said elements which generate signals are oriented so that their angles of incidence and reflection are identical.

19. A device according to claim 18, wherein said non-reflective surfaces are defined by slits.

* * * * *